Oct. 4, 1966  R. M. PAGE  3,277,475
RADAR RANGE TRACKING SYSTEM
Filed Jan. 5, 1950  3 Sheets-Sheet 1
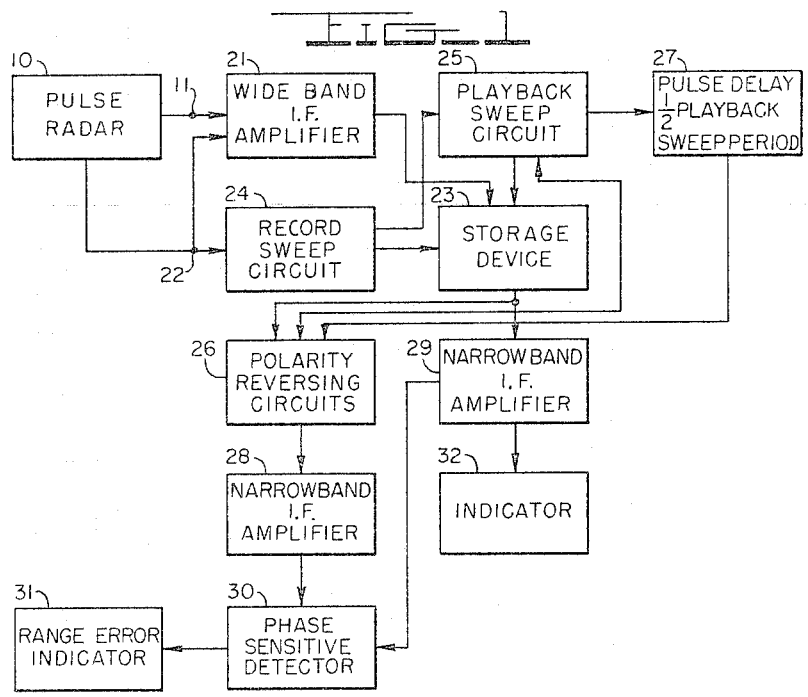
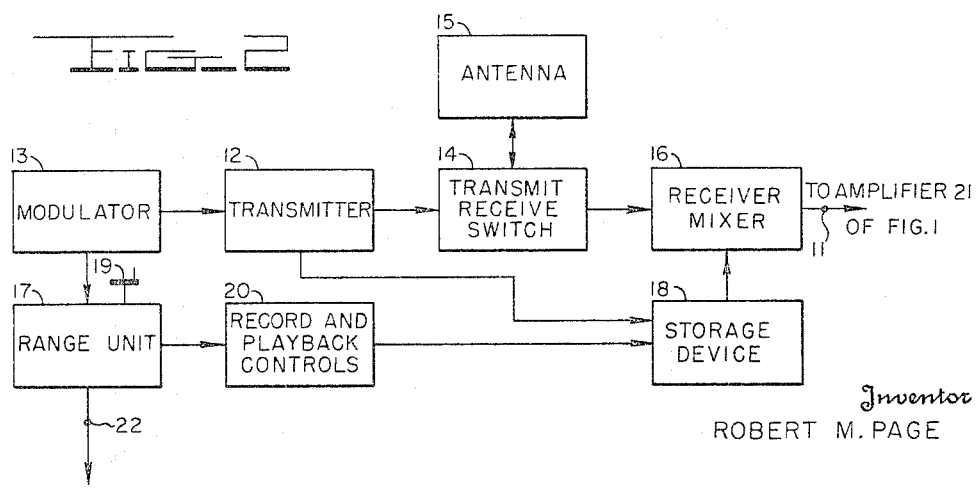
Inventor
ROBERT M. PAGE
By M. O. Keyes
ATTORNEY

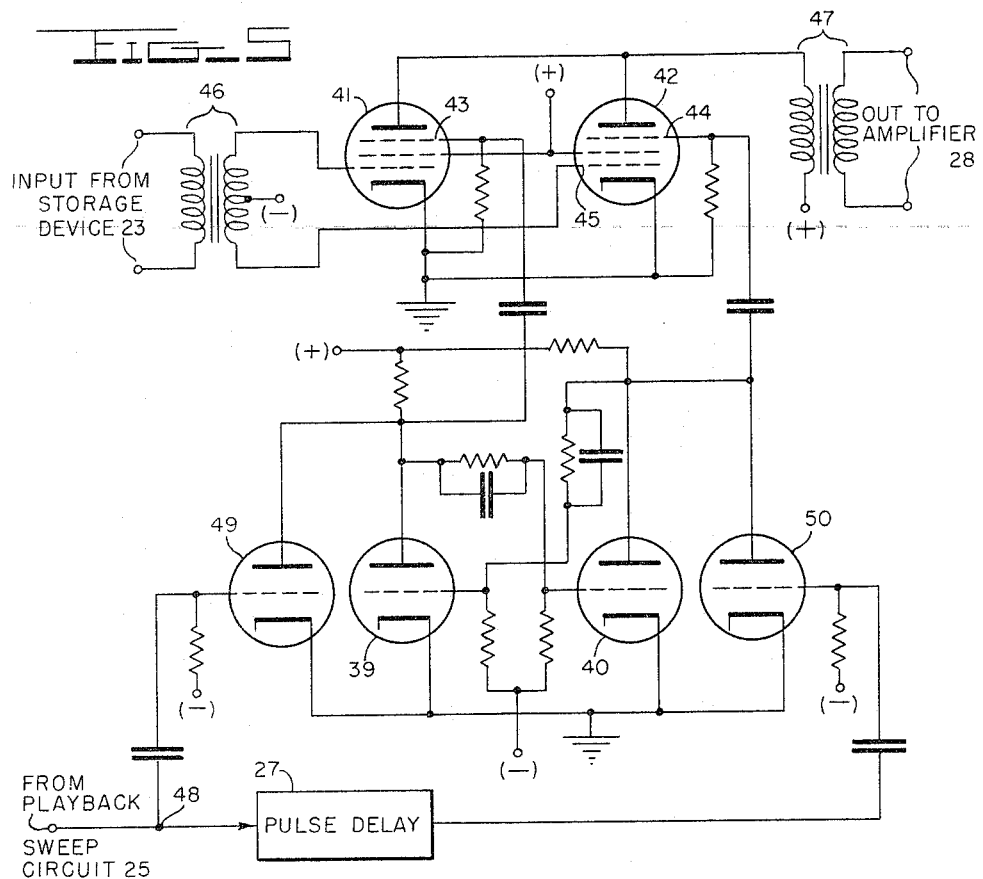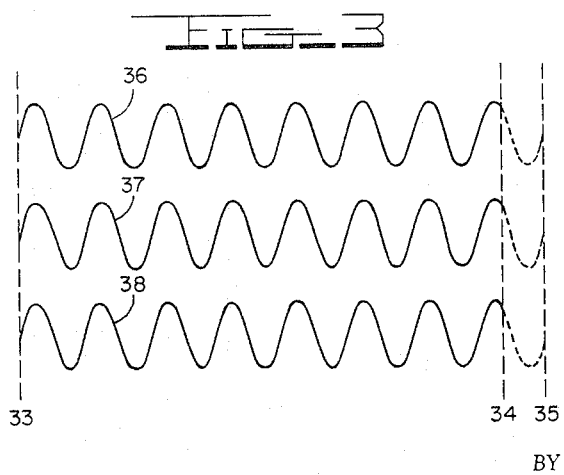

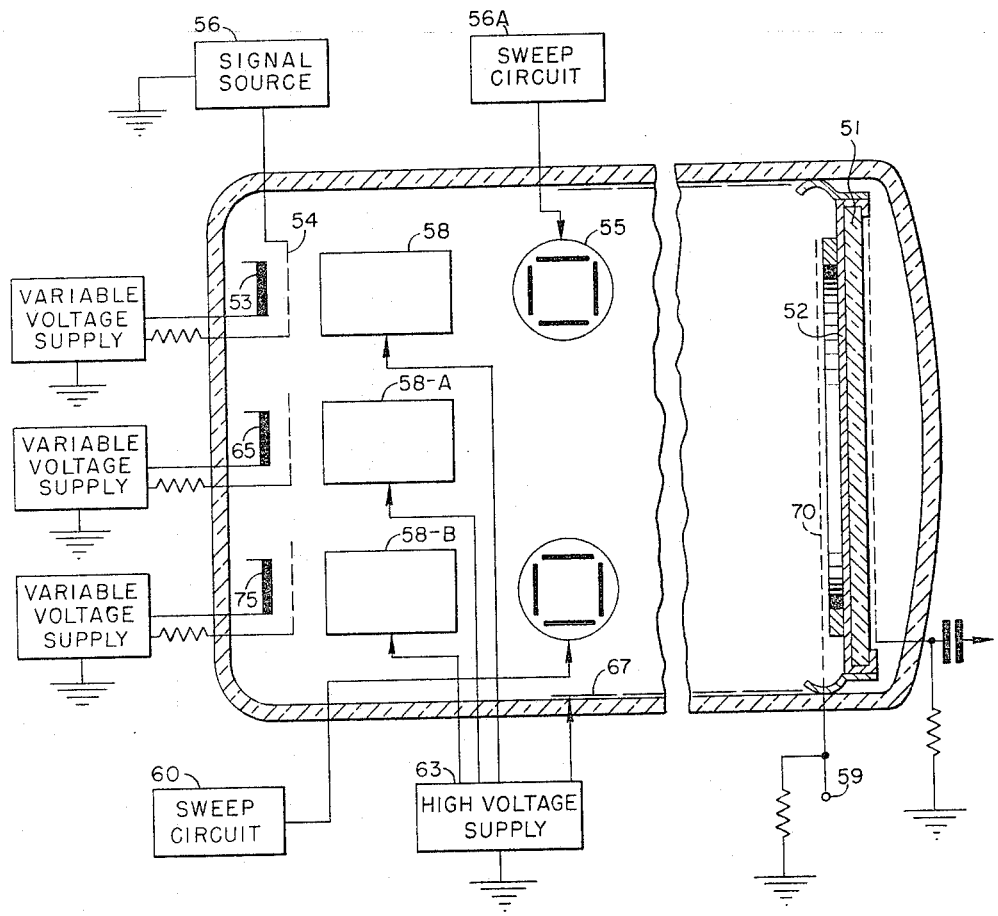

United States Patent Office 3,277,475
Patented Oct. 4, 1966

3,277,475
RADAR RANGE TRACKING SYSTEM
Robert M. Page, Camp Springs, Md.
Filed Jan. 5, 1950, Ser. No. 136,951
11 Claims. (Cl. 343—17.1)

The invention described herein may be manufactured and used by or for the Government of the United States of America for governmental purposes without the payment of any royalties thereon or therefor.

This invention relates to impulse receiver systems in general and in particular to range tracking devices for impulse operative locator systems such as sonar or radar having narrow bandwidth intermediate frequency amplifiers.

In my co-pending application Serial Number 135,215 filed December 27, 1949, entitled Signal Integrating Radar System there is described a radar system possessing numerous desirable features brought about as a result of a new form of operation in which received signals returned from successively emitted transmitter pulses are stored before detection and played back in succession with a very minimum of time spacing therebetween. Such operation effectively lengthens received pulse signals to reduce the width of the frequency spectrum of the resultant signal at intermediate frequency. This reduction permits an improvement of the signal to noise ratio because the bandwidth of amplifiers ahead of the detector can be narrowed. Because the reduction of signal spectrum width at intermediate frequency is accompanied by loss of precision range data in the signal after detection, present forms of apparatus for precision range tracking cannot be used.

Accordingly it is an object of the present invention to provide range tracking apparatus for signal integrator type locator systems.

Another object of the present invention is to provide range tracking apparatus with range capabilities commensurate with the range capabilities of signal integrator type locator systems.

Other and further objects and features of the present invention will become apparent upon a careful consideration of the following detailed description when taken in conjunction with the accompanying drawings in which:

FIG. 1 shows a block diagram of the apparatus of the present invention.

FIG. 2 shows in block form, details of a certain portion of the apparatus of FIG. 1.

FIG. 3 shows waveforms illustrative of the signal combination employed in the apparatus of the present invention.

FIG. 4 shows details of a typical signal storage tube employed in the apparatus of the present invention.

FIG. 5 is a schematic diagram of a component of the block diagram of FIG. 1.

The present invention contains certain apparatus which may be used in systems of the above mentioned signal integrating type to extend the usefulness thereof. In particular it is applicable to fire control radar systems in which a high degree of accuracy in range tracking of a target at long range is desired. Range tracking at the extreme distances of operation made possible by the foregoing integating system is brought about by reversing the play-back polarity of the second half of each recorded signal with respect to the playback polarity of the first half and integrating the playback signals in a narrow bandwidth intermediate frequency amplifier to achieve a condition of substantially zero integrated signal when each half possesses equal energy (in polarity opposition).

With particular reference now to FIG. 1 of the drawings, a block diagram is shown therein of a typical radar system employing the principles of the present invention. Block 10 is a pulse radar system providing pulse to pulse coherence in the intermediate frequency output signal at terminal 11. In pulse radar systems of this type all successive output pulses at intermediate frequency as obtained from an object at a certain range start with the same relative phase angle.

Such a pulse radar system is described in my co-pending patent application Serial Number 114,450 entitled Radar System filed September 7, 1949. Since the apparatus of this copending application possesses many features which are particularly desirable in conjunction with the present invention, FIG. 2 has been included to illustrate briefly the features thereof. It should be borne in mind however that the apparatus of the present invention is not limited to combination with the specific pulse radar set as exemplified in FIG. 2 but may be used with any type of radar or sonar set in which pulse to pulse coherence at intermediate frequency or at carrier frequency is maintained.

With reference now to FIG. 2 of the drawings the pulse radar system shown therein generates pulses of radio frequency energy, stores a part of each pulse of generated energy cycle by cycle, and emits the rest of the generated energy in a narrow beam. Emitted energy from each pulse which is reflected by a distant object is mixed with the stored signal from the same pulse to obtain an intermediate frequency signal. This operation is provided by the transmitter 12 which generates pulse of radio frequency energy at a repetition rate controlled by the modulator 13, the transmit-receive switch 14, the antenna 15, receiver-mixer 16 and range unit 17 all of which may be conventional radar components. A portion of each pulse of transmitter energy is recorded on a storage device 18 at the frequency generated or at an intermediate frequency derived therefrom. After selected time delays corresponding to transit delays introduced by the travel of energy to and from a selected range which may be selected manually by range selector control 19 and under the control of the converter record and playback control 20, the stored transmitter signal is played back typically at a frequency somewhat different from the frequency as recorded. This playback signal is mixed with received signals in receiver-mixer 16 to provide intermediate frequency output pulse signals at terminal 11 of a high degree of stability in which all received pulse signals from the same range start in the same phase.

Referring again to FIG. 1 the intermediate frequency signals from the receiver-mixer 16 of the pulse radar system 10 as appearing at terminal 11 as just described are supplied to a wide bandwidth intermediate frequency amplifier 21. The wide bandwidth intermediate frequency amplifier 21 may be a gated amplifier rendered sensitive to received signals occurring only at a selected time delay with respect to the generation of pulse signals by the radar system in accordance with operation of the range gate unit 17 of FIG. 2 which is set to a specified range by the range selector control 19 operated manually. Range unit 17 of FIG. 2 therefore may include pulse delay apparatus such as a one-shot multivibrator suitable for producing enabling gate pulses with selectable time delay following the generation of each pulse by the transmitter 12. These pulses are applied to the converter record and playback control 20 and also appear at terminal 22.

With the wide bandwidth intermediate frequency amplifier 21 thus rendered sensitive to return signals occurring only during a specific selected time interval after the emission of each pulse of energy from the radar system, output signals delivered therefrom to a second storage device 23 will correspond to those produced by echo signals returned from a selected range.

These echo signals are recorded in the storage device 23 where they are retained for a finite period of time. Storage device 23 may be of any form suitable for handling information at the rate and frequency involved. Typically for radar operation it may be an electronic storage tube such as that described in the co-pending application of A. V. Haeff, Serial Number 768,790 filed August 15, 1947, now Patent Number 2,813,998, entitled Method of Storing, Maintaining and Reproducing Electrical Signals and Means Therefor which is shown in FIG. 4 and subsequently described briefly. For the present it is adequate to consider the storage of a signal as taking place as intensity modulation of a line of electrons across the face of a cathode ray tube or indicator such as employed in conventional radar systems but wherein the short duration received pulse signal occupies the entire length of the sweep line. Storage of signals in this manner by the storage device 23 is accomplished through the operation of the record sweep circuit 24 which is synchronized by signals present at terminal 22. Each storage sweep is thus timed to start in coincidence with the start of each pulse echo obtained from the receiver of the pulse radar system 10 from selected range and to terminate with the termination of the radar pulse echo. Immediately following the termination of each radar pulse storage period a playback sweep signal is started by the playback sweep circuit 25 which may be synchronized from the record sweep circuit 24. The length of this playback sweep signal is preferably set to occupy substantially all of the time interval between the termination of one radar pulse echo and the initiation of a succeeding radar pulse echo. Thus the playback of energy recorded in device 23 will be substantially continuous but if desired may be interrupted momentarily during each radar pulse echo to permit storage thereof. In accordance with the typically one microsecond duration pulse repeated at the rate of a thousand per second the playback period will typically approach 999 microseconds and the record period will be one microsecond. As a general rule of course, the fly-back time required for the sweep circuits may necessitate a reduction in the total duration of the playback sweep period however in some instances it may even be practicable or desirable to accomplish the recording operation during the fly-back period for the playback sweep circuit. If recording and playback are accomplished with the same electron gun, the recording may be done during the fly-back of the playback sweep.

In the playback operation the reproduced I.F. signals obtained from the storage device 23 are delivered to polarity reversing circuits 26. These polarity reversing circuits also receive synchronizing pulse signals of two types, a first type of pulse signal is obtained direct from the playback sweep circuit 25 and in general is produced in coincidence with the start of each playback sweep. A second type of pulse signal is obtained from the pulse delay circuits 27 and is delayed with respect to the first type of pulse signals for a period of time equal to half the duration of the playback period for each received pulse echo. By means of these synchronizing pulses applied to the polarity reversing circuits 26 the playback signals will be delivered to a narrow bandwidth intermediate frequency amplifier 28 in a first polarity during the first half of the playback period and in the opposite polarity during the second half of the playback period.

When the range selector 19 of range gate unit 17 is set to the exact range of an energy reflective object producing the signals stored by storage device 23, the received signal will occupy substantially the entire playback time so that the total amount of signal present in the first half of the playback time is equal to the amount of signal in the second half. With equal signals thus combined in amplifier 28 in polarity opposition complete cancellation of the energy will result. If the range selector 19 is not adjusted to the exact range there will be a greater amount of I.F. signal present in one half of the playback period than in the other so that only a partial cancellation will occur. The resultant signal thus obtained will either be in phase with the actual playback signal or in phase opposition thereto depending upon whether the reflective object is at a lesser or greater range than the range setting of control 19. The signals thus existent may be employed to operate some sort of visual indication device to enable the operator of the apparatus to determine if the manual setting of range is correct to follow a target in its reflective motion toward or away from the radar system. Alternately these signals may be used to control a suitable servo system to operate the range selector 19 directly without requiring manual assistance.

To assist in the determination of the phasing of the resultant signal, the playback signals obtained from the storage device 23 are applied directly without polarity or phase changing to a tuned narrow bandwidth intermediate frequency amplifier 29 where a signal buildup rather than cancellation occurs when successive signals are in polarity or phase correspondence. The build-up signals from amplifier 29 are compared with the cancellation signals from amplifier 28 in a conventional phase sensitive detector 30. The result of this comparison is indicated on the range error indicator 31 which may be typically a zero centering milliameter, while the build-up signals are given by by indicator 32 which may typically be a cathode ray tube indicator to indicate positively the presence of a reflective object. It should be understood, however, that although the signal employed in determining the phasing of resultant signals is taken from the narrow band amplifier 29 in FIG. 1, operation of the phase sensitive detector could also occur with the output signal obtained direct from storage device 23.

In the playback operation, particular attention must be given to signal phasing for proper addition and cancellation as described to take place. As a general rule transmitter pulses reflected from constant range targets will all start with the same phasing. Ordinarily there is nothing to insure that the phase angle at the termination of each pulse and the time lapse at the end of the playback of each recorded pulse will be such as to make certain that the phase angle of the carrier wave of the integrated signal present in the narrow bandwidth intermediate frequency amplifier 29 from one signal will be in exact correspondence with carrier waves in a succedent signal when playback of the succedent signal is started.

Phase coherence between recorded signals on reproduction can be easily brought about by close control of the playback of the stored signals. This control involves the adjustment of the playback sweep length or duration so that it occupies a length on the face of the storage tube exactly equal to a multiple of the distance occupied by one cycle of the carrier wave of the stored signal and equal to a period of time differing from the duration of the stored received signal by a small amount, including zero. To illustrate this point reference is now made to FIG. 3 which shows three stored signals. It should be understood that these signals are shown one above the other and are represented as amplitude variations for convenience whereas the signals stored on the storage device 23 as just described in all probability would be on the same line and at successive instants of time rather than simultaneous as shown and would be stored as intensity or electron concentration variations. What is indicated by FIG. 3 as a dotted vertical line 33 represents the starting point for all storage and playback sweeps. The vertical line 34 represents the end of stored pulse signals while the vertical line 35 indicates the end of playback sweeps. In storage, the first signal 36 represents a received signal returned by a distant object responsive to a first transmitter pulse, the signal 37 represents a received signal returned by the same object responsive to a second transmitter pulse and the signal 38 represents a received signal returned by the same object responsive to a third transmitter pulse. All signals are shown identical which would ordinarily be the case for successive signals at a constant object range. The signals start in the same phase (which may or may not be zero degrees as shown) and end at some random phase. The playback period as indicated by dotted line 35 is longer than the recorded signal duration by a small amount.

In playback therefore the first stored signal 36 is scanned to deliver an I.F. signal to the narrow bandwidth intermediate frequency amplifier 29 in an interval of time the playback beam requires to travel from line 33 to line 34. When the playback beam reaches line 34 it does not fly-back immediately but continues to travel from line 34 to line 35 and then rapidly return to line 33 or experiences fly-back. In the time interval represented by the time required for the beam to move from line 34 to line 35 the absence of a recorded signal between lines 34 and 35 prevents delivery of an output signal to the narrow bandwidth intermediate frequency amplifier 29. This signal absence has negligible effect on the signals in the tuned amplifier 29, however, because of the short duration thereof and also because the tuned I.F. amplifier 29 by virtue of its natural tendency to "ring" continues the signal in a sinusoidal manner as indicated by the dotted line portion of signals 36, 37 and 38 between the lines 34 and 35.

In the ordinary course of operation, the first stored signal 36 may be erased by the playback operation itself so that the second received signal 37 can then be stored responsive to a second transmitter pulse. This signal can be stored in the interval of time represented by the spacing between lines 34 and 35 as shown or if this fraction of a carrier wave cycle is inadequate, the spacing between lines 34 and 35 may be lengthened to include some whole number of cycles of the carrier wave in addition to the fraction of a cycle as shown between lines 34 and 35 in FIG. 3. With the phase angle existing at line 35 as at the initial line 33 in-phase addition of signals can occur.

The storage tube of A. V. Haeff as previously referred to is shown in FIG. 4. Typically two such storage tubes would be employed in the apparatus of FIG. 1, one in the pulse radar 10 (block 18 of FIG. 2) and one in the storage device 23. This tube has an insulator plate 51 with an active surface 52 placed thereon. Typically the plate may be of glass and the active surface distributed willemite particles.

An initial charge distribution pattern representative of the transmitter pulse may be placed on the active surface 52 by an electron gun including cathode 53. The beam of this gun may be controlled by grid 54 and deflection means 55 under intensity control of signals supplied from signal source 56 and deflection signals from sweep circuit 56–A. Source 56, in the case of FIG. 1 may correspond to wide bandwidth intermediate frequency amplifier 21. The beam is focused by a conventional lens electrode system shown diagrammatically at 58, for which a high voltage supply 63 is provided. The main tube anode 67 coated on the interior of the envelope, it also energized by supply 63.

Signals placed on the active surface 52 are maintained hereon for considerable periods of time if so desired by delivering low velocity electrons thereto from an electron gun assembly including the cathode 65 and focusing lens system 58–A.

Screen 70 possessing close spacing such as 200 mesh per inch collects secondary electrons emitted from the surface 52 upon bombardment by playback scanning electrodes from a playback electron gun including cathode 75 and focusing lens system 58–B. This playback scan is controlled by the playback sweep circuit 60. Output signals produced from the secondary emission current to screen 70 are obtained at terminal 59 and represent the I.F. output signals delivered from the storage device 23 of FIG. 1 to polarity reversing circuits 26 and narrow bandwidth intermediate frequency amplifier 29. Sweep circuit 56–A corresponds to the recording sweep circuit 24 of FIG. 1 whereas sweep circuit 60 corresponds to the playback sweep circuit 25.

Erasure of the stored signals is accomplished by diminishing or terminating the holding beam from cathode 65 or if desired can be accomplished by the writing beam from cathode 53 itself.

It is to be appreciated that this storage tube employs three separate electron beam devices. A gun with three such electron beam devices will be found advantageous in certain cases because it permits simultaneous recording and playback.

Where the operation is synchronized to such an extent that reading and writing never take place simultaneously, a single electron gun may be employed to perform in sequence the three operations of record, playback and erase permitting a much simpler tube structure to be employed than that shown in FIG. 4. Such a single beam tube may not of necessity require a "holding" beam of electrons but may sustain the stored signal by other means until it is "picked up" in the playback operation.

It is thus seen that a tremendous flexibility of operation and of selection of a storage device is available without exceeding the scope of the present invention. By and large only conventional radar circuits are required for the various components of the apparatus.

Details of the polarity reversing circuits 26 and the comparison pulse delay 27 are shown in FIG. 5. In a simple form this equipment comprises a trigger circuit having tubes 39 and 40 controlling gating tubes 41 and 42.

Tubes 39 and 40 are connected in the familiar Eccles-Jordan circuit wherein either one tube or the other is conductive. When tube 39 is conductive with the anode thereof at a low potential, the connection of the anode to the grid 43 of tube 41 holds tube 41 non-conductive. At this same time, tube 40 is non-conductive with its anode at a high potential placing grid 44 of tube 42 at a condition with a substantially zero biasing potential, a condition which makes tube 42 responsive to input signals applied to its control grid 45. Thus tube 42 can amplify signals appearing across the lower portion of the center tapped secondary of transformer 46 to provide signals at transformer 47 for delivery to the narrow bandwidth intermediate frequency amplifier 28 (in FIG. 1). Input signals to transformer 46 are the signals from storage device 23 (in FIG. 1) and transformer 46 itself is of a type having a center tapped secondary providing signals of opposing polarity across the upper and lower halves.

In the opposing condition of the trigger circuit of the tubes 39 and 40 wherein tube 39 is cut-off and tube 40 conductive, the reverse conductive conditions of tubes 41 and 42 prevail and the output signals sent to transformer 47 are amplified signals as appearing across the upper half of the secondary of transformer 46.

With this sort of connection therefore the output from transformer 47 will be either in-phase with the input to transformer 46 or in phase opposition thereto depending upon the condition of the trigger circuit of tubes 39 and 40.

Conditions of the trigger circuit are controlled from the operation of the playback sweep circuit 25 (FIG. 1). As each horizontal sweep signal is started, a short duration positive pulse signal preferably derived from the record circuit 24 is delivered to terminal 48. This short duration pulse signal causes conduction in triggering tube 49 to produce a voltage drop at the anode of tube 39. If at this instant, tube 39 is non-conductive, this voltage drop will cut off tube 40 and render tube 39 conductive.

Following this action, and with a short delay caused typically by the operation of pulse delay circuit 27 (also FIG. 1), the second triggering tube 50 receives a short duration positive pulse to produce a potential drop at the anode of tube 40 and bring tube 40 to conduction.

Operation in this manner from one condition to the other takes place for every playback sweep of the stored signals in storage device 23.

The delay introduced by pulse delay circuit 27 is such as to cause the tube 40 to become conductive at precisely the mid point of the playback scanning signal so that reproduced signals corresponding to signals stored in the first half of the storage region will be in one polarity whereas the signals from the other half of the storage region will be in opposing polarity.

Other means of obtaining the desired delay could also be used, such, for example, as a trigger circuit responsive to the half-voltage point of the playback sweep voltage.

Where the range gate is centered on the signal so that the entire signal is stored, approximately equal amounts of signal energy will be present in both halves of the storage region and with combination in opposition, cancellation of output signals as previously discussed will be effected. In this discussion the slight signal lapse period in playback shown in FIG. 3 between lines 34 and 35 necessary for playback coherence has been neglected. A condition of balance would correspond to polarity reversal at the center of the stored signal record, represented by the space between lines 33 and 34 of FIG. 3.

It should be understood that the principles of the present invention have been outlined in a manner most desirable for the plastic apparatus of FIG. 1 corresponding in other essential principles to the apparatus of FIG. 1 of my co-pending application Serial Number 135,215, filed December 27, 1949, entitled Signal Integrating Radar System. The principles of this invention are equally applicable to other forms of basic apparatus, such as those of FIGS. 3 and 4 of the co-pending application just mentioned.

From the foregoing discussion it is apparent that considerable modification of the features of this basic invention is possible without exceeding the scope thereof as defined in the appended claims.

What is claimed is:

1. A radar system comprising, transmitter means recurrently emitting short duration pulses of carrier frequency energy, receiver means intercepting return energy, storage means retaining signals returned during a selected time interval after each emitted pulse, means reproducing said retained signals with short delay between successive reproduced signals, said last named means operating to reproduce said retained signals occurring during one half of the selected time interval in reverse polarity with respect to those in the other half, and integrating means combining the reproduced signals.

2. In an echo energy operative detection device, means storing in carrier waves received signals occurring during successive short duration time intervals widely separated in time, means reproducing the stored signals during substantially the entire time spacing between the successive short duration time intervals, selective polarity alteration means reversing the polarity of the signals reproduced from one half of each short duration time interval with respect to those reproduced from the other half of each time interval, a narrow bandwidth circuit connected to the output of the last named means combining reproduced signals received therefrom.

3. In a pulse-echo system wherein short duration signals occurring at widely spaced periods of time are recorded in carrier waves upon occurrence and coherently reproduced with short time separation, signal delivery means reversing the carrier wave polarity of one half of each reproduced signal with respect to the other half, signal integrating means connected to said last named means combining carrier wave reproduced signals to derive output signals inversely proportional to relative signal amounts present in each half.

4. A pulse-echo system comprising, transmitter means emitting short duration pulses of energy at successively widely-spaced instants of time, means receiving pulse echo signals returned by distant objects, means storing received signals occurring at a selected time instant substantially equal in duration to the pulse duration, said time instant delayed with respect to the emission of pulses of energy by a selected amount, means reproducing stored signals in carrier waves with short duration time spacing therebetween, signal delivery means reversing the polarity of reproduced signals in one half of the selected time instant with respect to reproduced signals in the other half of the time instant, and means connected to said last named means combining the signals from the two halves of the time instant to achieve a condition of substantial signal cancellation when each half contains equal stored signals.

5. A pulse-echo system comprising, transmitter means emitting short duration pulses of energy at successive widely-spaced instants of time, means receiving pulse echo signal returned by distant objects, means storing received signals occurring at a selected time instant substantially equal in duration to the pulse duration, said time instant delayed with respect to the emission of pulses of energy by a selected amount, means reproducing stored signals in carrier waves with short duration time spacing therebetween, signal delivery means reversing the polarity of reproduced signals in one-half of the selected time instant with respect to reproduced signals in the other half of the time instant, integrating means connected to said last named means combining the signals from the two halves of the time instant to achieve a condition of substantial signal cancellation when each half contains equal stored signal, and only partial cancellation when the two halves have different amounts of stored signals, and phase sensitive signal detection means connected to the output of the integrating means indicating the sense and amplitude of partial cancellation signals therefrom.

6. In an electrical apparatus wherein a first signal of finite duration having cyclically varying characteristics and a second signal of a duration short relative to that of the first signal occurring during the first signal are combined, signal delivery means reversing the polarity of the portion of said first signal occurring subsequent to the second signal, phase sensitive integration means combining the output signals from said last named means, phase sensitive comparison means connected to the integration means responsive to produce a final output signal in dependency on both the amplitude and the phase of the combined signal from the integration means relative to said first signal, and a utilization device responsive to the output of the comparison means.

7. A radio echo locator system, comprising means periodically transmitting short time duration widely spaced pulses of electromagnetic energy and for receiving reflections thereof returned during an adjustable short time interval following each pulse emission, means storing the energy returned during said interval, means reproducing said energy in the period between successive ones of said time intervals, means reversing the phase of the energy reproduced during the first half period of reproduction with respect to that reproduced during the second half period of reproduction, and means quantitatively comparing the amounts of energy reproduced during said half periods of reproductions.

8. In a pulse echo detection system which includes a transmitter for transmitting periodic pulses of electromagnetic wave energy and a receiver for receiving said pulses after reflection from a remote object and for delivering coherent intermediate frequency echo output pulses, a cathode ray tube storage system for storing the coherent output signals from said receiver occurring during a selected time interval after each transmitted pulse, a signal playback circuit for reproducing the stored signal energy, the reproduction of said stored signal extending over substantially the entire interval between successive signal storage intervals, a first narrow bandwidth signal translating circuit and a phase reversing circuit coupled to receive the reproduced signal in parallel, said phase reversing circuit being operable to reverse the phase of the reproduced signal translated thereby during the first half of the reproduction interval relative to the phase of the reproduced signal translated thereby during the second half of the reproduction interval, a second narrow bandwidth signal translating means coupled to the output of said phase reversing circuit, and a phase sensitive detector coupled to the output of said first and second narrow bandwidth translating circuits for indicating the relative phases of the output signals obtained from said first and second signal translating means.

9. In a pulse echo detection system which includes a transmitter for transmitting periodic pulses of electromagnetic wave energy and a receiver for receiving said pulses after reflection from a remote object and for delivering coherent intermediate frequency echo output pulses, a cathode ray tube storage system coupled to the output of said receiver, means for rendering said storage system operative to store only those output echo signals from said receiver which are returned from a selected object, a signal playback circuit for reproducing the stored signal energy during substantially the entire interval between successive echo pulses returned by said selected object, a first narrow bandwidth signal translating circuit and a phase reversing circuit coupled to receive the reproduced signals in parallel, said phase reversing circuit being operable to reverse the phase of the reproduced signal translated thereby during the first half of the reproduction interval relative to the phase of the reproduced signal translated thereby during the second half of the reproduction interval, a second narrow bandwidth signal translating means coupled to the output of said phase reversing circuit, and a phase sensitive detector coupled to the output of said first and second narrow bandwidth translating circuits for indicating the relative phases of the output signals obtained from said first and second signal translating means.

10. In a pulse echo detection system which includes a transmitter for transmitting periodic pulses of electromagnetic wave energy and a receiver for receiving said pulses after reflection from a remote object and for delivering coherent intermediate frequency echo output pulses, a cathode ray tube storage system for storing the coherent output signals from said receiver, a signal playback circuit for reproducing the stored signal energy returned from a selected object, the reproduction of said stored signal extending over substantially the entire interval between successive echo pulses returned by said selected object, a phase reversing circuit coupled to receive the reproduced signal, said phase reversing circuit being operable to reverse the phase of the reproduced signal translated thereby during the first half of the reproduction interval relative to the phase of the reproduced signal translated thereby during the second half of the reproduction interval, a narrow bandwidth signal translating means coupled to the output of said phase reversing circuit, and a detector means coupled to the output of said narrow bandwidth signal translating means for indicating the phase of the output signal derived therefrom.

11. In a pulse echo detection system which includes a transmitter for transmitting periodic pulses of electromagnetic wave energy and a receiver for receiving said pulses after reflection from a remote object and for delivering coherent intermediate frequency echo output pulses, a cathode ray tube storage system for storing the coherent output signals from said receiver, a signal playback circuit for reproducing the stored signal energy returned from a selected object, the reproduction of said stored signal extending over substantially the entire interval between successive echo pulses returned by said selected object, a phase reversing circuit coupled to receive the reproduced signal, said phase reversing circuit being operable to reverse the phase of the reproduced signal translated thereby during the first half of the reproduction interval relative to the phase of the reproduced signal translated thereby during the second half of the reproduction interval, a narrow bandwidth signal translating means coupled to the output of said phase reversing circuit, and a utilization circuit coupled to the output of said narrow bandwidth signal translating means for utilizing the output signal derived therefrom.

References Cited by the Examiner
UNITED STATES PATENTS
2,524,837   10/1950   Russel _____ 343—5
FOREIGN PATENTS
604,673   7/1948   Great Britain.

CHESTER L. JUSTUS, *Primary Examiner.*

SIMON YAFFEE, NORMAN H. EVANS, *Examiners.*

WALTER W. BURNS, G. J. MOSSINGHOFF, A. K. GEER, R. D. BENNETT, *Assistant Examiners.*